(12) United States Patent
Umehara et al.

(10) Patent No.: US 8,220,800 B2
(45) Date of Patent: Jul. 17, 2012

(54) SEAL LAYER-TRANSFERRED METAL GASKET

(75) Inventors: Keisuke Umehara, Himeji (JP);
Masahisa Kumashiro, Okayama (JP);
Takayuki Hikami, Fukuchiyama (JP)

(73) Assignee: Kokusan Parts Industry Co., Ltd., Toyonaka-shi (JP)

( * ) Notice: Subject to any disclaimer, the term of this patent is extended or adjusted under 35 U.S.C. 154(b) by 816 days.

(21) Appl. No.: 12/007,521

(22) Filed: Jan. 11, 2008

(65) Prior Publication Data

US 2008/0169615 A1 Jul. 17, 2008

(30) Foreign Application Priority Data

Jan. 15, 2007 (JP) ................... 2007-005356

(51) Int. Cl.
*F16J 15/12* (2006.01)
*F02F 11/00* (2006.01)

(52) U.S. Cl. ........................... 277/313; 277/592

(58) Field of Classification Search ............... 277/591, 277/592, 593, 598
See application file for complete search history.

(56) References Cited

U.S. PATENT DOCUMENTS

| | | | |
|---|---|---|---|
| 3,930,656 A * | 1/1976 | Jelinek | 277/611 |
| 6,454,267 B1 * | 9/2002 | Gaines et al. | 277/312 |
| 6,719,293 B1 * | 4/2004 | Coles et al. | 277/312 |
| 6,893,727 B2 * | 5/2005 | Adachi et al. | 428/465 |

FOREIGN PATENT DOCUMENTS

| | | | |
|---|---|---|---|
| DE | 3704000 A1 | * | 8/1988 |
| JP | 2000-028002 A | | 1/2000 |
| WO | WO 9110851 A1 | * | 7/1991 |

* cited by examiner

*Primary Examiner* — Gilbert Lee
(74) *Attorney, Agent, or Firm* — Edwards Wildman Palmer LLP (57) ABSTRACT

To provide a seal layer-transferred metal gasket that can effectively prevent degradation in seal performance due to the wearing and peeling of the coating layer. A head gasket is interposed between a cylinder block and a cylinder head. In the metal gasket seal layers made by laminating a separation layer, a coating layer and an adhesive layer in this order from the bead sheet side is formed at least on the surface of the bead sheet facing the cylinder block and the cylinder head, and, in a state where the head gasket is interposed between the cylinder block and the cylinder head and the three objects are closely attached to each other, the adhesive layer is adhered to the seal target members, and at least some portions of the coating layer and adhesive layer are separated from the bead sheet with a boundary at the separation layer and then transferred to the seal areas of the cylinder block and cylinder head.

16 Claims, 6 Drawing Sheets

SEAL LAYER-TRANSFERRED METAL GASKET

The present invention relates to a seal layer-transferred metal gasket that can be suitably used as a head gasket for automobile engine.

BACKGROUND OF THE INVENTION

1. Field of the Invention

There has been proposed and commercialized a head gasket interposed between a cylinder block and cylinder head in an automobile engine in which beads are formed so as to surround combustion chamber openings, oil holes, bolt holes, or the like, and a coating layer is formed all over a gasket component sheet constituting the head gasket and/or along the beads, thereby obtaining an improvement in seal performance (see Patent Document 1, for example).

Patent Document 1 Japanese Unexamined Patent Publication No. 2000-28002

2. Description of the Background Art

The head gasket described in Patent Document 1 is acted upon by shear forces in an in-plane direction due to a difference in expansion between the cylinder block and the cylinder head, and by repeated loads in a direction of extension and shrinkage of a clearance between the cylinder block and the cylinder head during engine operation. This causes problems in that, across the ages, the coating layer peels off and decreases seal performance and the cooling water filter becomes clogged and impairs cooling performance.

An object of the present invention is to provide a seal layer-transferred metal gasket that can effectively prevent degradation in seal performance due to the wearing and peeling of the coating layer.

SUMMARY OF THE INVENTION

The inventor has keenly examined a mechanism of peeling of the coating layer and found out that the coating layer becomes easily worn out and peeled off when the coating layer is rubbed against the seal areas of the cylinder block and cylinder head which are made relatively rough by machining processes such as cutting and grinding. The inventor has then focused attention on a fact that the surface of a metal gasket made from a rolled metal sheet is significantly small in roughness as compared with the seal areas of the cylinder block and cylinder head. Accordingly, the inventor has come to conceive that it is possible to dramatically suppress the wearing and peeling of the coating layer by transferring the coating layer to the seal areas of the cylinder block and cylinder head in such a manner that the coating layer slides over the surface of the metal gasket. Herewith the present invention has been completed.

A seal layer-transferred metal gasket relative to the present invention is a metal gasket including one or more gasket component sheets which is interposed between the seal areas of two seal target members in order to seal between the seal target members. In the metal gasket, a seal layer made by laminating a separation layer, a coating layer and an adhesive layer in this order from the gasket component sheet side is formed on at least the surface of the gasket component sheet facing the seal target members, and in a state where the metal gasket is interposed between the seal target members and the three objects are closely attached to each other, the adhesive layer is adhered to the seal target members, and at least some portions of the coating layer and adhesive layer are separated from the gasket component sheet with a boundary at the separation layer and then transferred to the seal areas of the seal target members.

This metal gasket is interposed between the seal areas of two seal target members to seal the seal target members. In a state where the metal gasket seals the two seal target members, the adhesive layer is adhered to the seal target members at least at high-surface pressure portions, the seal layer at the high-surface pressure portions is separated from the gasket component sheet with a boundary at the separation layer, the coating layer and adhesive layer at the high-surface pressure portions are transferred from the gasket component sheet to the seal areas of the seal target members. The coating layer transferred to the seal target members is thus attached by pressure to the surface of the metal gasket. Accordingly, even though the coating layer slides over the surface of the metal gasket due to a difference in heat expansion between the cylinder block and the cylinder head as seal target members as in the case with the head gasket, it is possible to effectively preclude the wearing and peeling of the coating layer by lessening the surface roughness of the metal gasket, thereby avoiding decreases in seal performance and durability of the coating layer.

In a preferred embodiment, at least the gasket component sheet facing the seal target members is made of a rolled metal sheet. Since the surface of a rolled metal sheet is smaller in surface roughness than other machined surfaces, it is possible to prevent effectively the wearing and peeling of the coating layer by decreasing a coefficient of friction between the coating layer transferred to the seal target members and the gasket component sheet made of the rolled metal sheet.

Alternatively, the seal layer can be linearly formed only at portions of the gasket component sheet requiring the sealing. Although the coating layer can be formed all over the surface of the gasket component sheet, the formation of the seal layer only at the portions to be sealed minimizes the use of the materials for the seal layer and, in the case with the head gasket, minimizes the exposure of the coating layer to the cooling water path, thereby precluding the deterioration of the coating layer due to contact with the cooling water.

In another preferred embodiment, the two seal target members are a cylinder block and a cylinder head. As stated above, the head gasket interposed between the cylinder block and the cylinder head is acted upon by shear loads in an in-plane direction and repeated loads in a thickness direction with respect to the coating layer. However, since the coating layer is adhered to the cylinder block and the cylinder head via the adhesive layer and slides over the surface of the metal gasket, the wearing and peeling of the coating layer can be reduced by lessening the surface roughness of the metal gasket, thereby avoiding decreases in seal performance and cooling performance resulting from the wearing and peeling.

A seal method using a seal layer-transferred metal gasket relative to the present invention is a seal method using the above seal layer-transferred metal gasket. In this method, the metal gasket is interposed between the seal target members and the three objects are closely attached to each other, the adhesive layer is adhered to the seal target members, and at least some portions of the coating layer and adhesive layer are transferred to the seal areas of the seal target members with a boundary at the separation layer.

By this seal method, the seal layer-transferred metal gasket is interposed as it is between the seal target members and the three objects are closely attached to each other. This suppresses the wearing and peeling of the coating layer and improves the durability of the coating layer, as described above.

According to a seal layer-transferred metal gasket and a seal method using the same relative to the present invention, the seal layer-transferred metal gasket is interposed as it is between the seal target members and the three objects are closely attached to each other, whereby the coating layer at least at high-surface pressure portions is transferred to the seal target members, and the seal target members and the metal gasket are sealed between the coating layer transferred to the seal target members and the metal gasket. Accordingly, even though the coating layer slides over the surface of the metal gasket due to a difference in heat expansion or the like between the cylinder block and the cylinder head as seal target members as in the case with the head gasket, it is possible to effectively prevent the wearing and peeling of the coating layer by lessening the surface roughness of the metal gasket, thereby avoiding decreases in seal performance and durability of the coating layer.

DESCRIPTION OF THE PREFERRED EMBODIMENTS

Several embodiments of the present invention will be described below with reference to the drawings. In the embodiments, the present invention is applied to a head gasket interposed between a cylinder block and cylinder head of an in-line multicylinder engine.

Figure 1:
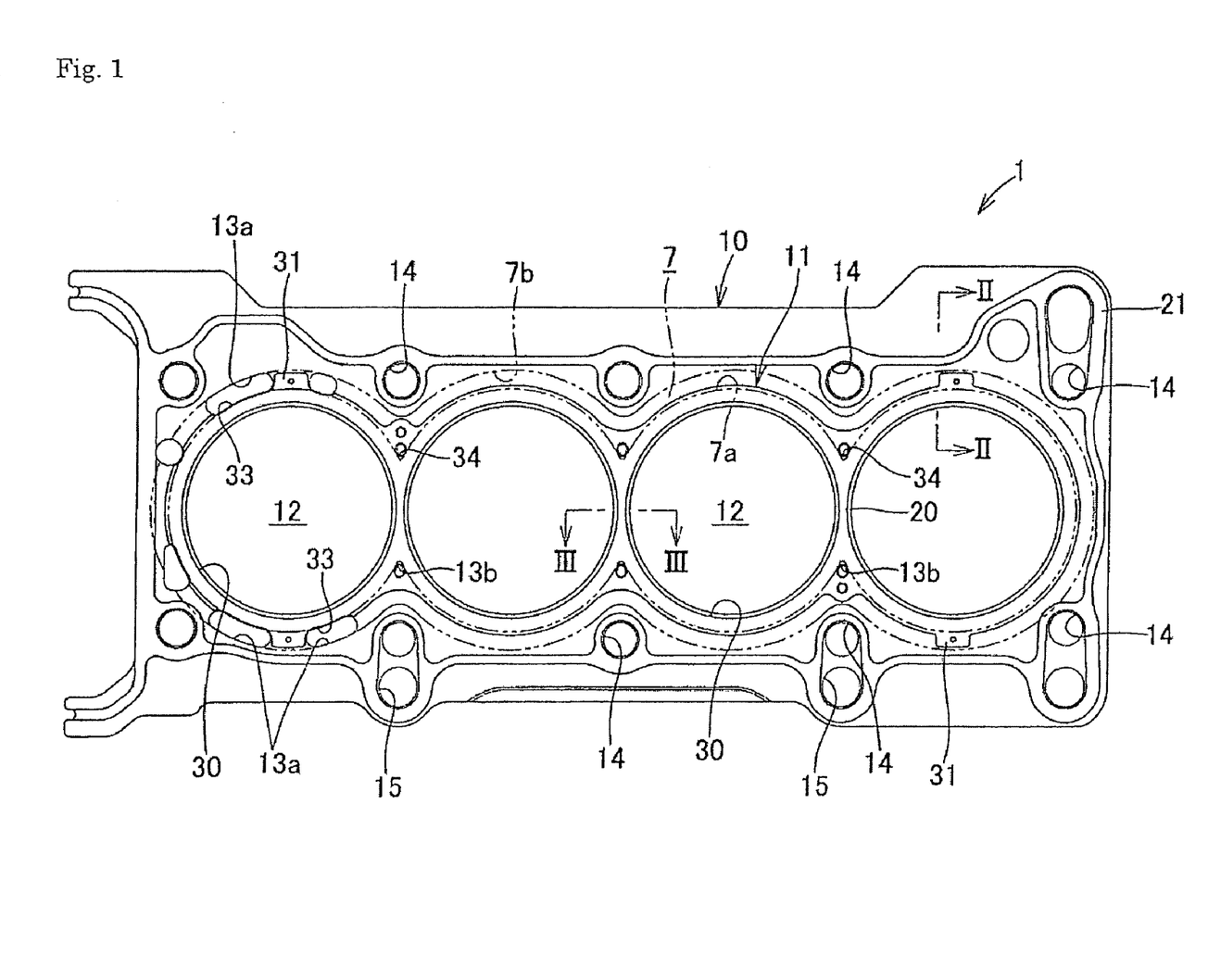
FIG. 1 is a bottom view of a head gasket.
Figure 2:
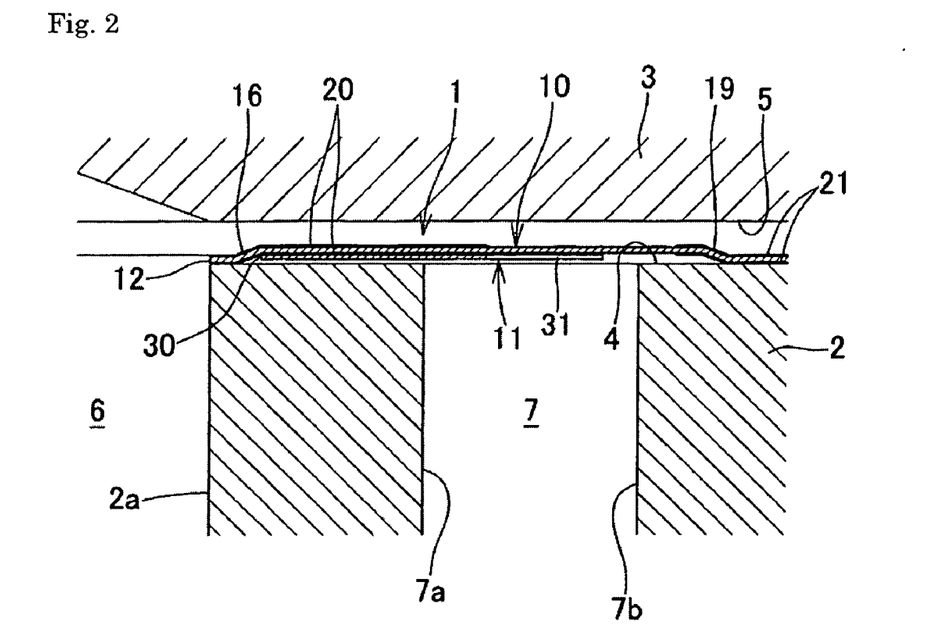
FIG. 2 is a vertical cross section view of FIG. 1 taken along line II-II in which the head gasket is being fitted into between a cylinder block and a cylinder head.

As shown in FIGS. 1 and 2, a head gasket 1 is interposed between seal areas 4 and 5 of a cylinder block 2 and a cylinder head 3 as seal target members in order to seal a combustion chamber 6, a water jacket 7, a lubricating oil path (not shown), or the like. The head gasket 1 relative to the present invention can be applied to an engine with a cast-iron cylinder block and also to an engine with a cylinder block and cylinder head based on light alloy metal such as aluminum alloy, magnesium alloy, or the like. In the embodiments of the present invention described below, the present invention is applied to an engine in which the open-deck cylinder block 2 has the water jacket 7 opened at the top side and the cylinder block 2 and cylinder head 3 are made of aluminum alloy. The present invention is also applicable to a cylinder block having the water jacket 7 not opened at the top side.

Figure 3:
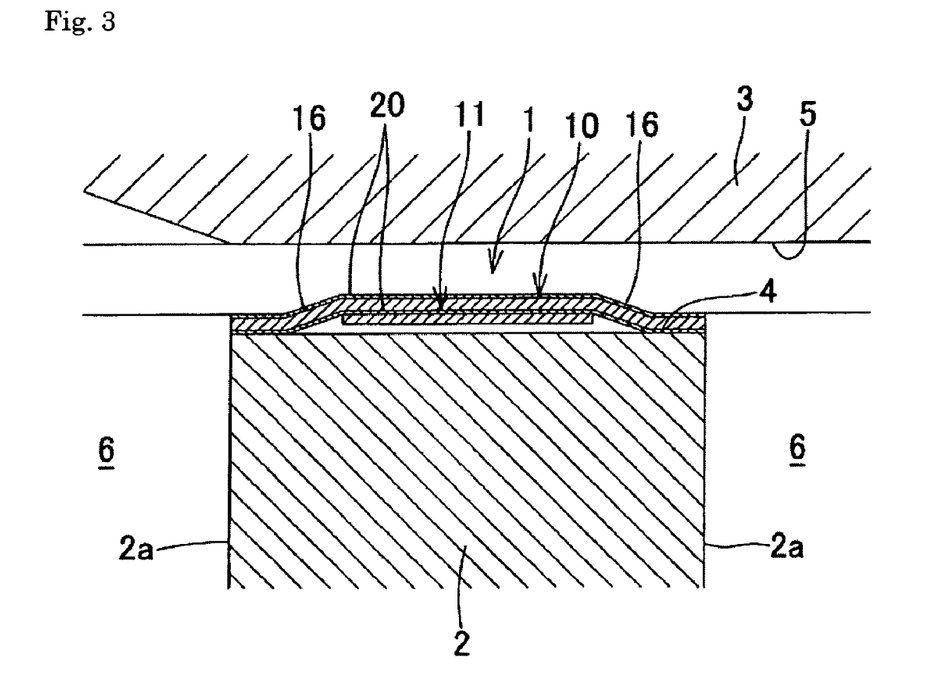
FIG. 3 is a cross section view of FIG. 1 taken along line III-III in which the head gasket is being fitted into between the cylinder block and the cylinder head.

As shown in FIGS. 1 to 3, the head gasket 1 includes: a bead sheet 10, as a gasket component sheet made of a rolled metal sheet, interposed between almost all over the seal areas 4 and 5 of the cylinder block 2 and cylinder head 3; seal layers 20 and 21 formed on the surface of the bead sheet 10; a shim sheet 11 as a gasket component sheet laid on the bead sheet 10 between the outer periphery edge of a bore bead 16 and an inner peripheral area 7a of the water jacket 7 formed in the cylinder block 2 of the engine. The head gasket 1 shown in FIG. 2 is interposed between the seal areas 4 and 5 with the shim sheet 11 provided on the cylinder block 2 side. Alternatively, the head gasket 1 may be interposed between the seal areas 4 and 5 with the shim sheet 11 provided on the cylinder head 3 side.

Figure 4:
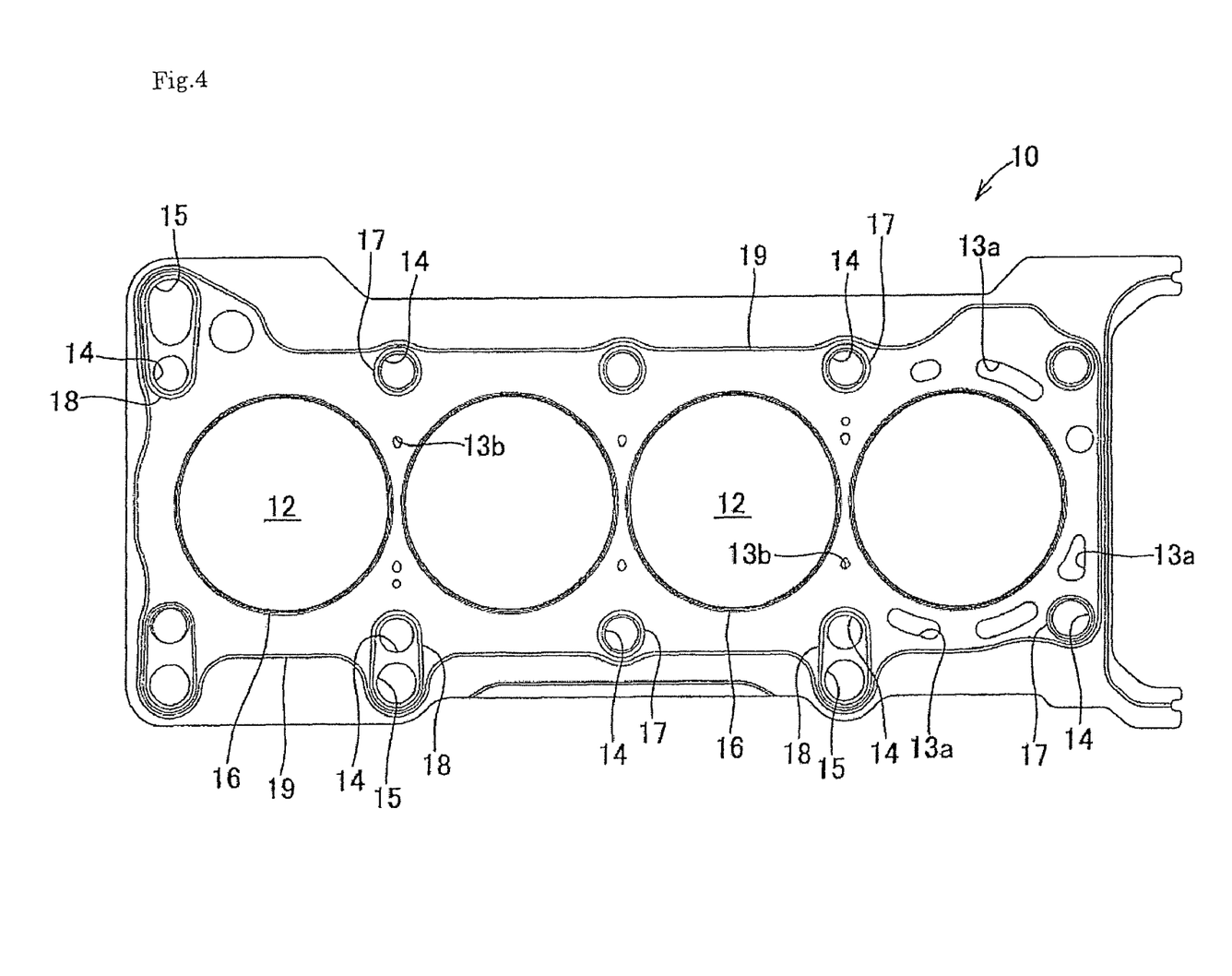
FIG. 4 is a plan view of a bead sheet before the formation of seal layers.

The bead sheet 10 includes a stainless steel sheet made of precipitation-hardened high-silicon two-phase stainless steel, SUS 301-based general materials, SUS 630- or SUS 631-based precipitation-hardened stainless steel. The shape of outer edge of the bead sheet 10 is the almost same as those of the seal areas 4 and 5 of the cylinder block 2. The thickness of the bead sheet 10 is set at 0.15 to 0.4 mm, preferably 0.15 to 0.35 mm, and preferably in particular 0.2 to 0.25 mm. This is because, if the thickness is less than 0.15 mm, the stiffness of beads decreases and the surface pressure becomes insufficient, and if the thickness exceeds 0.4 mm, cracks may occur due to deterioration of a processed material or excessive tightening of a head bolt.

A plurality of openings 12 composed of circular holes are spaced out in the longitudinal direction in the almost widthwise central area of the bead sheet 10 in such a manner to correspond to the combustion chamber 6. A plurality of cooling water holes 13a are arranged in a predetermined array on the outside of the openings 12 at one side of the sheet in such a manner to correspond to the water jacket 7. Cooling water holes 13b are arranged in the front and rear sides between the adjacent openings 12 in such a manner to correspond to the water jacket 7. A plurality of bolt insertion holes 14 through which head bolts (not shown) are inserted for fixing the cylinder head 3 to the cylinder block 2 are spaced out by four for one opening 12 in correspondence with the outside of the water jacket 7 in such a manner to surround the openings 12, whereby the cylinder head 3 is tightened in a balanced manner with respect to the cylinder block 2. Oil holes 15 through which lubricating oil passes are formed on the outside of particular bolt insertion holes 14, such that the lubricating oil is fed from the cylinder block 2 to the cylinder head 3 for lubrication of a valve operating mechanism and the like.

As shown in FIGS. 2 to 4, the bead sheet 10 is formed with the bore beads 16 surrounding the combustion chamber 6, bolt hole beads 17 surrounding the bolt insertion holes 14, bolt oil hole beads 18 surrounding the bolt insertion holes 14 and the oil holes 15 together, outer peripheral beads 19 surrounding all these bolt hole beads 17 and bolt oil hole beads 18. The outer peripheral beads 19 may not surround the bolt hole beads 17 and bolt oil hole beads 18, provided that they are arranged so as to surround the water jacket 7. The beads 16 to 19 include step beads formed from step portions in the metal sheet, but they may be circular beads in the shape of a partial arc in cross section, or may be any combinations of step beads and circular beads. In the bead sheet 10, the shapes, numbers, and layouts of the openings 12, cooling water holes 13a and 13b, bolt insertion holes 14 and oil holes 15, and the shapes, numbers, and layouts of the beads 16 to 19, can be set arbitrarily depending on the engine configuration and the like.

Figure 7:
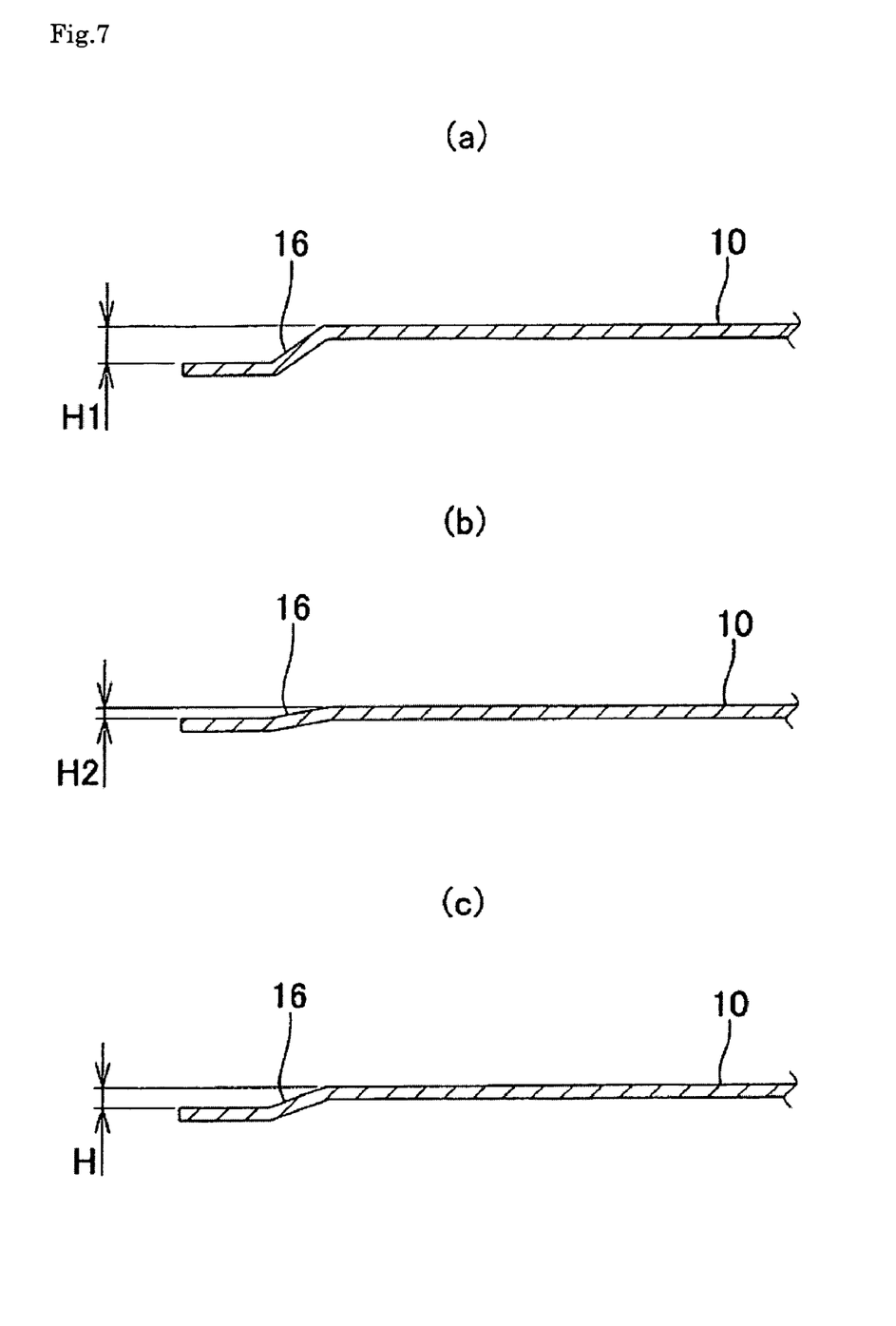
FIG. 7 are illustrative views of how to form a step bead.

For a step bead constituting the bore bead 16, a metal sheet material is press-molded such that the process height of the step bead becomes a height H1 of three to four times the thickness of the bead sheet 10 as shown in FIG. 7 (*a*), and then the metal sheet material is flattened such that the process height of the step bead becomes a height H2 below the thickness of the shim sheet 11 as shown in FIG. 7 (*b*), whereby the step bead is formed with a height H as shown in FIG. 7 (*c*). As stated above, since the step bead is formed with the height of three to four times the thickness of the bead sheet 10 and then the metal sheet material is flattened such that the process height of the step bead becomes below the thickness of the bead sheet 10 to form the step bead of the required height H, the fatigue limit of the step bead is enhanced due to work hardening and the occurrence of cracking in the step bead can be effectively prevented. The required height H is set to be two to four times the thickness of the shim sheet 11 for sufficient seal performance, for example. However, the flattening is not always required and may be omitted. In addition, the beads 17 to 19 may be formed in the same manner as with the bore bead 16.

Provided on the both faces of the bead sheet 10 are seal layers 20 and 21 in which a separation layer 22, a coating layer 23, and an adhesive layer 24 are laminated through pattern printing in this order from the bead sheet 10 side, the first seal layer 20 corresponding to the bore bead 16 and the shim sheet 11, and the second seal layer 21 corresponding to the beads 17 to 19, as shown in FIGS. 1 to 6. When the head gasket 1 is interposed between the cylinder block 2 and the cylinder head 3 and then the head bolt is tightened, bending portions 25 on the inner and outer peripheries of the step beads 16 to 19 cause locally high surface pressures at the outside surfaces (shown with hatching in FIG. 5) as compared with the other portions. At least at these high-surface pressure portions 26, the adhesive layer 24 is adhered to the seal areas 4 and 5 of the cylinder block 2 and cylinder head 3, and then the adhesive layer 24 and coating layer 23 at the high-surface pressure portions 26 are separated from the bead sheet 10 with a boundary at the separation layer 22 and transferred to the seal areas 4 and 5 of the cylinder block 2 and cylinder head 3. Alternatively, in another preferred embodiment, incisions may be created in advance in the seal layers 20 and 21 along the both sides of the high-surface pressure portions 26 so that separation occurs only at the high-surface pressure portions 26 and does not extend to the other portions. Pattern printing includes printing techniques such as relief printing, planographic printing, intaglio printing, screen printing, flock printing, magnetic printing and hot stamping, and material application techniques using a dispenser.

Figure 5:
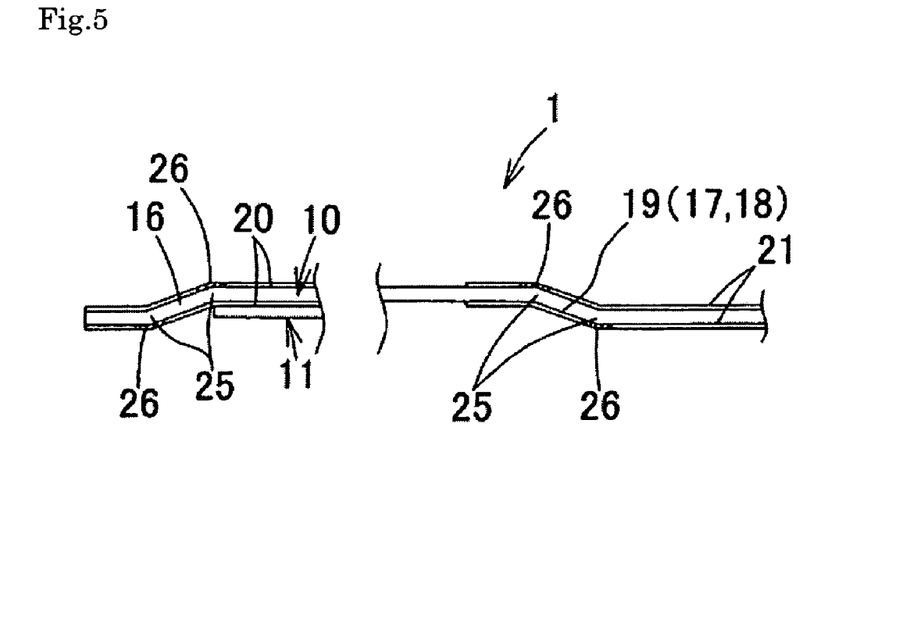
FIG. 5 is an illustrative view of high-surface pressure portions in the seal layers.

The widths of the both seal layers 20 and 21 are set so as to cover at least the high-surface pressure portions 26 in the surface of the bead sheet 10. The widths are supposed to be 0.5 mm or more and 3.0 mm or less, preferably 1.0 mm or more and 2.0 mm or less because too small widths provide insufficient durability and too large widths increase the usage of the materials. However, in the scope of the present invention, the seal layers 20 and 21 can be formed all over the surface of the bead sheet 10 or can be formed only on one face of the bead sheet 10. Additionally, it is also possible to form a coating layer all over the surface of the bead sheet 10 as is conventionally done and then form the seal layers 20 and 21 on the coating layer.

Figure 6:
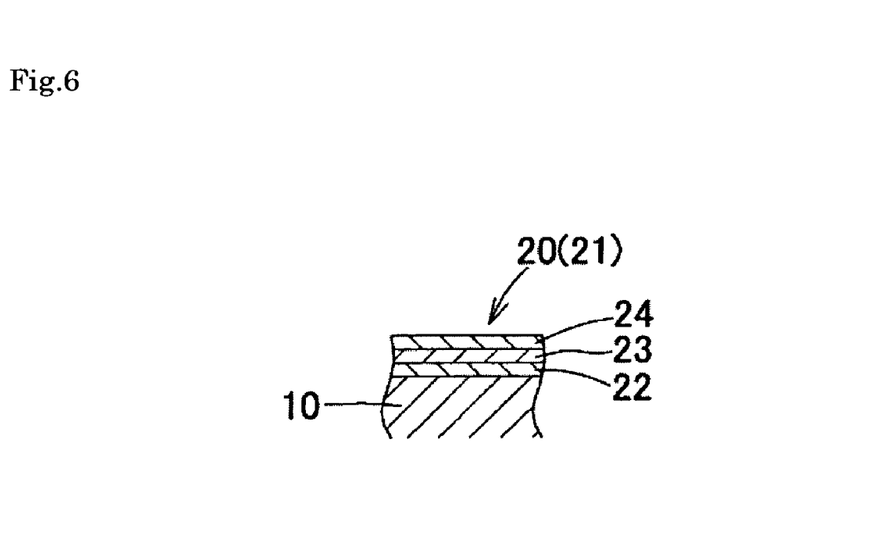
FIG. 6 is a vertical cross section view of the seal layer.

The thicknesses of the seal layers 20 and 21 are supposed to be 17 μm or more and 50 μm or less for sufficient durability and seal performance. The thickness of the separation layer 22 is to be set to 1 μm or more and 10 μm or less because too small thickness causes insufficient separation and too large thickness increases the seal layers 20 and 21 in thickness. The thickness of the coating layer 23 is to be set to 15 μm or more and 30 μm or less because too small thickness provides insufficient durability and seal performance and too large thickness increases the seal layers 20 and 21 in thickness. The thickness of the adhesive layer 24 is to be set to 1 μm or more and 10 μm or less because too small thickness provides insufficient adhesive strength and too large thickness increases excessively the seal layers 20 and 21 in thickness. In addition, the first seal layer 20 and the second seal layer 21 may be different in width and thickness.

Possible materials for the coating layer 23 include synthetic rubber materials such as fluorine rubber, NBR rubber, SBR rubber and silicon rubber, and synthetic resin materials such as epoxy-based resins, silicon-based resins, phenol-based resins, urethane-based resins, polyimide-based resins, vinyl chloride-based resins, acrylic-based resins, polyurethane-based resins, ABS-based resins and PTFE (polytetrafluoroethylene)-based resins, and composite materials in which these synthetic rubber materials and synthetic resin materials are mixed with metallic powder of aluminum alloy, copper, brass, stainless, or the like, glass powder, glass fiber, ceramic powder, ceramic fiber, molybdenum disulfide powder, or the like. The materials are selected appropriately depending on the use conditions. For example, the coating layer 23 of the first seal layer 20 arranged on the both upper and lower sides of the bore bead 16 is made of a coating material with excellent heat-resistant and abrasion-resistant properties for the purpose of sealing against high-temperature combustion gases and cooling water, and the coating layer 23 of the second seal layer 21 arranged on the both upper and lower sides of the other beads may be made of a coating material with excellent liquid-tight and abrasion-resistant properties for the purpose of sealing against the lubricating oil and cooling water. However, the second seal layer 21 may be further divided into plural regions in which coating layers of different materials are formed, depending on the use conditions.

The separation layer 22 may employ appropriately a wax-based release agent, silicone-based release agent, fluorine-based release agent, PVA-based release agent, a graphite-based release agent, or the like.

The adhesive layer 24 may employ appropriately a synthetic rubber-based adhesive agent, urethane-based adhesive agent, epoxy-based adhesive agent, silane-based adhesive agent, or the like.

Like the bead sheet 10, the shim sheet 11 is composed of a stainless steel sheet such as SUS301 under the JIS standards or a well-known metal material having characteristics equivalent thereto, and is disposed in a region between the outer peripheral edge of the bore bead 16 and the inner peripheral area 7a of the water jacket 7 formed in the cylinder block 2 of the engine. However, unlike the bead sheet 10, the shim sheet 11 has no beads 16 to 19 and thus may be composed of a metal material available at a more inexpensive cost than that for the bead sheet 10. The thickness of the shim sheet 11 is set between 0.05 and 0.15 mm, preferably between 0.08 and 0.12 mm. When the head bolt is tightened, a clearance equivalent to the thickness of shim sheet 11 is provided around the bore bead 16 so that the bore bead 16 is not fully bent.

The shim sheet 11 has four openings 30 that are composed of circular holes of the same diameter as the outer periphery edge of the bore bead 16. The edges of these four openings 30 are located along the outer periphery edge of the bore bead 16. The outer edge of the shim sheet 11 is provided up to a location corresponding to the inner peripheral area 7a of the water jacket 7 in order to minimize a surface pressure on the cylinder block 2 corresponding to the shim sheet 11. In the scope of the present invention, however, the outer edge of the shim sheet 11 may be arranged slightly inside the inner peripheral area 7a of the water jacket 7. In addition, since the molding accuracy of the inner peripheral area 7a of the water jacket 7 is relatively low, the shim sheet 11 is preferably extended to the region corresponding to the water jacket 7 so that the outer edge of the shim sheet 11 is reliably provided up to the location corresponding to the inner peripheral area 7a of the water jacket 7. The outer edge of the shim sheet 11 may be extended outside the outer peripheral area 7b of the water jacket 7, but this leads to a higher manufacturing cost of the shim sheet 11. It is thus preferable to arrange the shim sheet 11 within the region corresponding to the water jacket 7 and near the inner peripheral area 7a of the water jacket 7.

Fixed parts 31 protruding within the region corresponding to the water jacket 7 are integrally formed in the shim sheet 11 at the front and rear parts corresponding to the openings 30 on the right and left ends. The shim sheet 11 is fixed to the bead sheet 10 via these four fixed parts 31 attached to the bead sheet 10 by spot welding, riveting or mechanical clinching. The shim sheet 11 has notches 33 and cooling water holes 34 at positions corresponding to the cooling water holes 13a and 13b in the bead sheet 10 so that the shim sheet 11 does not impede the distribution of cooling water.

In an engine fitted with the head gasket 1 of such a construction, the shim sheet 11 is arranged on the outer peripheral side of the bore bead 16 and acts as a stopper for preventing the full bending of the bore bead 16. This keeps the bore bead 16 from cracking due to the full bending of the bore bead 16 and avoids effectively a decrease in seal performance resulting from the occurrence of cracking. Moreover, since the shim sheet 11 is provided only in a portion corresponding to between the outer peripheral edge of the bore bead 16 and the inner peripheral area 7a of the water jacket 7, a manufacturing cost of the shim sheet 11 can be lowered as compared with the case in which the shim sheet 11 is provided up to the outer edge of the head gasket 1, and a higher surface pressure can be caused on the bore bead 16 around the combustion chamber 6 than those on the beads 17 to 19, thereby providing sufficient seal performance around the combustion chamber 6. Further, since the distance between the outer peripheral edge of the bore bead 16 and the inner peripheral area 7a of the water jacket 7 can be made longer than the distance between the inner peripheral edge of the bore bead 16 and the lip of the opening 12, it is possible to prevent a locally high surface pressure on the cylinder block 2 around the combustion chamber 6 and cause a surface pressure on the cylinder block 2 in an area distant from the cylinder hole 2a, thereby effectively precluding the deformation of the cylinder hole 2a.

In addition, when the head gasket 1 is interposed between the cylinder block 2 and the cylinder head 3 and then the head bolt is tightened, the adhesive layers 24 of the seal layers 20 and 21 at the high-surface pressure portions 26 are adhered to the cylinder block 2 and the cylinder head 3, the coating layers 23 and the adhesive layers 24 are separated from the bead sheet 10 with a boundary at the separation layers 22 and transferred to the seal areas 4 and 5 of the cylinder block 2 and cylinder head 3. Then, even if the head gasket 1 slightly moves in an in-plane direction with respect to the cylinder block 2 and the cylinder head 3 due to a difference in heat expansion between the cylinder block 2 and the cylinder head 3 and to repeated loads in a direction of extension and shrinkage of a clearance between the cylinder block 2 and the cylinder head 3, the slight movement occurs between the coating layer 23 and the bead sheet 10. Therefore, the coating layer 23 slides over the bead sheet 10 made of a rolled metal sheet with smaller surface roughness, not over the seal areas 4 and 5 of the cylinder block 2 and cylinder head 3 that are processed by cutting and grinding. This effectively avoids the wearing and peeling of the coating layer 23, thereby preventing decreases in seal performance and durability of the coating layer 23. The head gasket 1 is constantly held between the cylinder block 2 and the cylinder head 3, and the high-surface pressure portions 26 and the other portions are in almost the same plane. Accordingly, even when the coating layer 23 and the adhesive layer at the high-surface pressure portions 26 are separated from the bead sheet 10, the coating layer 23 is not severed between the high-surface pressure portions 26 and the outsides thereof.

Description will be given below as to another embodiment of the head gasket 1A that is partly modified in structure. The same members as those of the above-described embodiment are given the same reference numerals, and they will not be described here in detail.

Figure 8:
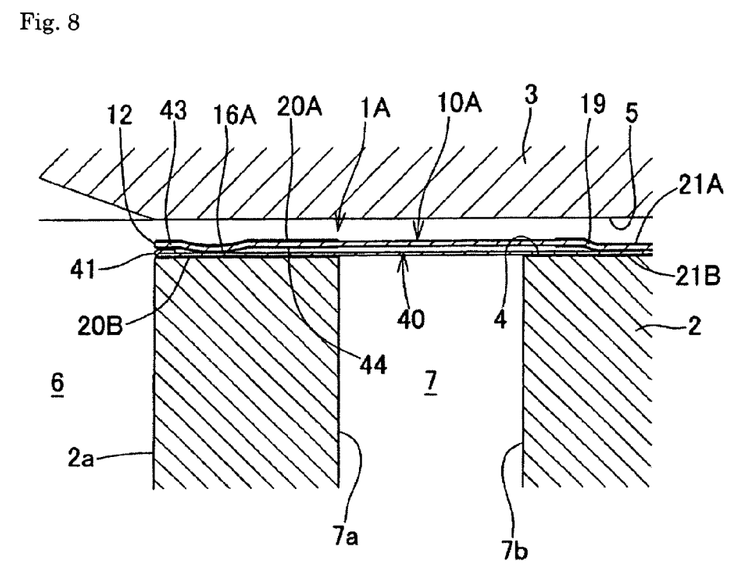
FIG. 8 is a view corresponding to FIG. 2 in which another structure of head gasket is being fitted into between the cylinder block and the cylinder head.

In the head gasket 1A, as shown in FIG. 8, a bead sheet 10A is provided with a bore bead 16A composed of a round bead in the shape of an arc in cross section protruding toward the cylinder block 2, in place of the bore bead 16 composed of a step bead in the bead sheet 10 of the above embodiment, and a stopper sheet 40 almost the same in shape and size as the bead sheet 10A is laid on the under side of the bead sheet 10A, in place of the shim sheet 11. The bead sheet 10A and the stopper sheet 40 may be made of the same material as that for the bead sheet 10A. As with the bead sheet 10A, the stopper sheet 40 has an opening 41, a bolt insertion hole (not shown) and an oil hole (not shown). The stopper sheet 40 and the bead sheet 10A are bound to each other by spot welding, riveting, mechanical clinching or the like on the outside of a clearance between the seal areas 4 and 5 of the cylinder block 2 and cylinder head 3.

The stopper sheet 40 has a folded-back portion 42 that is folded back toward the bead sheet 10A at the edge of the opening 41, and is flattened except at the folded-back portion 42. The bead sheet 10A has a flat portion 43 on the opening 12 side of the bore bead 16A. The folded-back portion 42 faces the flat portion 43.

The bead sheet 10A has, on the surface facing the cylinder head 3, seal layers 20A and 21A in which the separation layer 22, the coating layer 23 and the adhesive layer 24 are laminated through pattern printing in this order from the bead sheet 10A side, as with the seal layers 20 and 21 in the above-described embodiment. The first seal layer 20A is formed so as to contain the bore bead 16A and the flat portion 43, the second seal layer 21A is formed so as to contain the beads 17 to 19 as with the bead sheet 10 in the above-described embodiment. In addition, the bead sheet 10A has, on the surface facing the cylinder block 2, coating layers 44 and 45 in the positions corresponding to the first and second seal layers 20A and 21A. However, the coating layers 44 and 45 may be formed on the stopper sheet 40.

The stopper sheet 40 has, on the surface facing the cylinder block 2, first and second seal layers 20B and 21B in which the separation layer 22, the coating layer 23 and the adhesive layer 24 are laminated through pattern printing in this order from the stopper sheet 40 side in correspondence with the first and second seal layers 20A and 21A of the bead sheet 10A, as with the seal layers 20 and 21 in the above-described embodiment.

Figure 9:
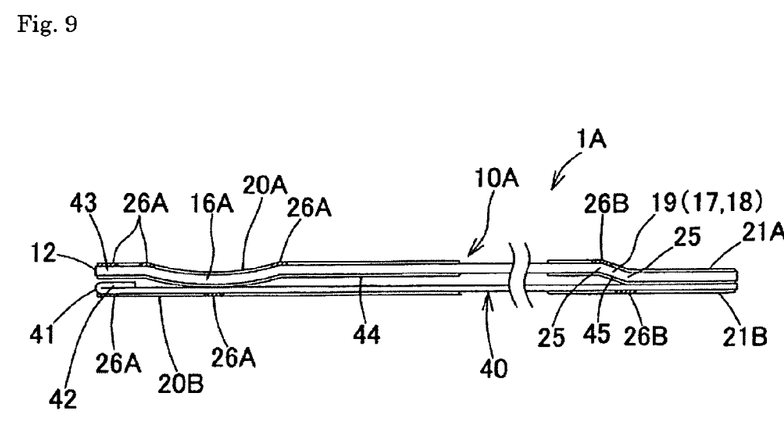
FIG. 9 is an illustrative view of high-surface pressure portions in the seal layers of the head gasket shown in FIG. 8.

When the head gasket 1A is interposed between the cylinder block 2 and the cylinder head 3 and then the head bolt is tightened, the folded-back portion 42 acts as a stopper for preventing the full bending of the bore bead 16A. This keeps the bore bead 16A from cracking due to the full bending of the bore bead 16A and precludes effectively a decrease in seal performance resulting from the occurrence of cracking. In addition, high surface pressures are caused at the portions shown with hatching in FIG. 9, that is, the portion corresponding to the folded-back portion 42 in the first seal layer 20A of the bead sheet 10A, the portions on the both sides of the bore bead 16A, and the bending portions 25 in the beads 17 to 19 of the second seal layer 21A on the cylinder head 3 side (inner periphery side). At the high-surface pressure portions 26A, the first seal layers 20A and 21A are separated and transferred to the seal face 5 of the cylinder head 3. Moreover, in the stopper sheet 40, high surface pressures are caused at the portion in the first seal layer 20B corresponding to the folded-back portion 42 and the portion in the first seal layer 20B corresponding to the crest of the bore bead 16A, and the bending portions 25 in the beads 17 to 19 of the second seal layer 21B on the cylinder block 2 side (outer periphery side). At the high-surface pressure portions 26B, the seal layers 20B and 21B are separated and transferred to the seal face 4 of the cylinder block 2. As stated above, the seal layers are separated and the coating layer 23 slides over the surface of the bead sheet 10A or stopper sheet 40 made of a rolled metal sheet with smaller surface roughness, not over the seal areas 4 and 5 of the cylinder block 2 and cylinder head 3 processed by cutting and grinding, whereby the wearing and peeling of the coating layer 23 can be effectively prevented. This avoids decreases in seal performance and durability of the coating layer 23.

In these embodiments described above, the present invention is applied to the head gasket 1 with two gasket component sheets. Alternatively, a head gasket with one or three or more head gaskets can be structured in which the seal layers 20 and 21 are formed on the surfaces of the gasket component sheet facing the seal areas of the cylinder block and cylinder head so as to contain high-surface pressure portions, the seal layers 20 and 21 at the high-surface pressure portions 26 are transferred from the gasket component sheet to the seal areas 4 and 5 of the cylinder block 2 and cylinder head 3, thereby preventing the wearing and peeling of the coating layer 23.

The present invention can be applied to multi-cylinder V-type engines and single-cylinder engines as well as in-line multi-cylinder engines. Moreover, the present invention is applicable to various metal gaskets as a component of engine such as a metal gasket interposed between an induction manifold and a cylinder head, and metal gaskets for use in automobile parts other than engines and in the other industrial machinery.

What is claimed is:

1. An improved seal layer-transferred metal gasket comprising one or more gasket component sheets which is interposed between seal areas of two seal target members in order to seal the seal target members,
the improvement comprising
a seal layer made by laminating a separation layer comprising a release agent, a coating layer having a sealing function and an adhesive layer in this order from the gasket component sheet side at least on a surface of the gasket component sheet facing the seal target members,
in a state wherein the metal gasket is interposed between the seal target members and the three objects are closely attached to each other, the adhesive layer is adhered to the seal target members, and at least some portions of the coating layer and adhesive layer are separated from the gasket component sheet with a boundary at the separation layer and then transferred to the seal areas of the seal target members.

2. The improved seal layer-transferred metal gasket according to claim 1, wherein at least the gasket component sheet facing the seal target members are made of a rolled metal sheet.

3. The improved seal layer-transferred metal gasket according to claim 1, wherein the seal layer is linearly formed only at portions of the gasket component sheet requiring the sealing.

4. The improved seal layer-transferred metal gasket according to claim 1, wherein the two seal target members are a cylinder block and a cylinder head.

5. A method of sealing two target elements using the improved seal layer-transferred metal gasket according to claim 1, comprising the steps of:
interposing the metal gasket between the seal target members such that the three objects are closely attached to each other,
adhering the adhesive layer to the seal target members, and
transferring at least some portions of the coating layer and adhesive layer to the seal areas of the seal target members with a boundary at the separation layer.

6. The improved seal layer-transferred metal gasket according to claim 2, wherein the seal layer is linearly formed only at portions of the gasket component sheet requiring the sealing.

7. The improved seal layer-transferred metal gasket according to claim 2, wherein the two seal target members are a cylinder block and a cylinder head.

8. The improved seal layer-transferred metal gasket according to claim 3, wherein the two seal target members are a cylinder block and a cylinder head.

9. The improved seal layer-transferred metal gasket according to claim 6, wherein the two seal target members are a cylinder block and a cylinder head.

10. A method of sealing two target elements using the improved seal layer-transferred metal gasket according to claim 2, comprising the steps of:
interposing the metal gasket between the seal target members such that the three objects are closely attached to each other,
adhering the adhesive layer to the seal target members, and
transferring at least some portions of the coating layer and adhesive layer to the seal areas of the seal target members with a boundary at the separation layer.

11. A method of sealing two target elements using the improved seal layer-transferred metal gasket according to claim 3, comprising the steps of:
interposing the metal gasket between the seal target members such that the three objects are closely attached to each other,
adhering the adhesive layer to the seal target members, and
transferring at least some portions of the coating layer and adhesive layer to the seal areas of the seal target members with a boundary at the separation layer.

12. A method of sealing two target elements using the improved seal layer-transferred metal gasket according to claim 4, comprising the steps of:
interposing the metal gasket between the seal target members such that the three objects are closely attached to each other,
adhering the adhesive layer is adhered to the seal target members, and
transferring at least some portions of the coating layer and adhesive layer to the seal areas of the seal target members with a boundary at the separation layer.

13. A method of sealing two target elements using the improved seal layer-transferred metal gasket according to claim 6, comprising the steps of:
interposing the metal gasket between the seal target members such that the three objects are closely attached to each other,
adhering the adhesive layer to the seal target members, and
transferring at least some portions of the coating layer and adhesive layer to the seal areas of the seal target members with a boundary at the separation layer.

14. A method of sealing two target elements using the improved seal layer-transferred metal gasket according to claim 7, comprising the steps of:
- interposing the metal gasket between the seal target members such that the three objects are closely attached to each other,
- adhering the adhesive layer to the seal target members, and
- transferring at least some portions of the coating layer and adhesive layer to the seal areas of the seal target members with a boundary at the separation layer.

15. A method of sealing two target elements using the improved seal layer-transferred metal gasket according to claim 8, comprising the steps of:
- interposing the metal gasket between the seal target members such that the three objects are closely attached to each other,
- adhering the adhesive layer to the seal target members, and
- transferring at least some portions of the coating layer and adhesive layer to the seal areas of the seal target members with a boundary at the separation layer.

16. A method of sealing two target elements using the improved seal layer-transferred metal gasket according to claim 9, comprising the steps of:
- interposing the metal gasket between the seal target members such that the three objects are closely attached to each other,
- adhering the adhesive layer to the seal target members, and
- transferring at least some portions of the coating layer and adhesive layer to the seal areas of the seal target members with a boundary at the separation layer.

* * * * *